Figure 3:
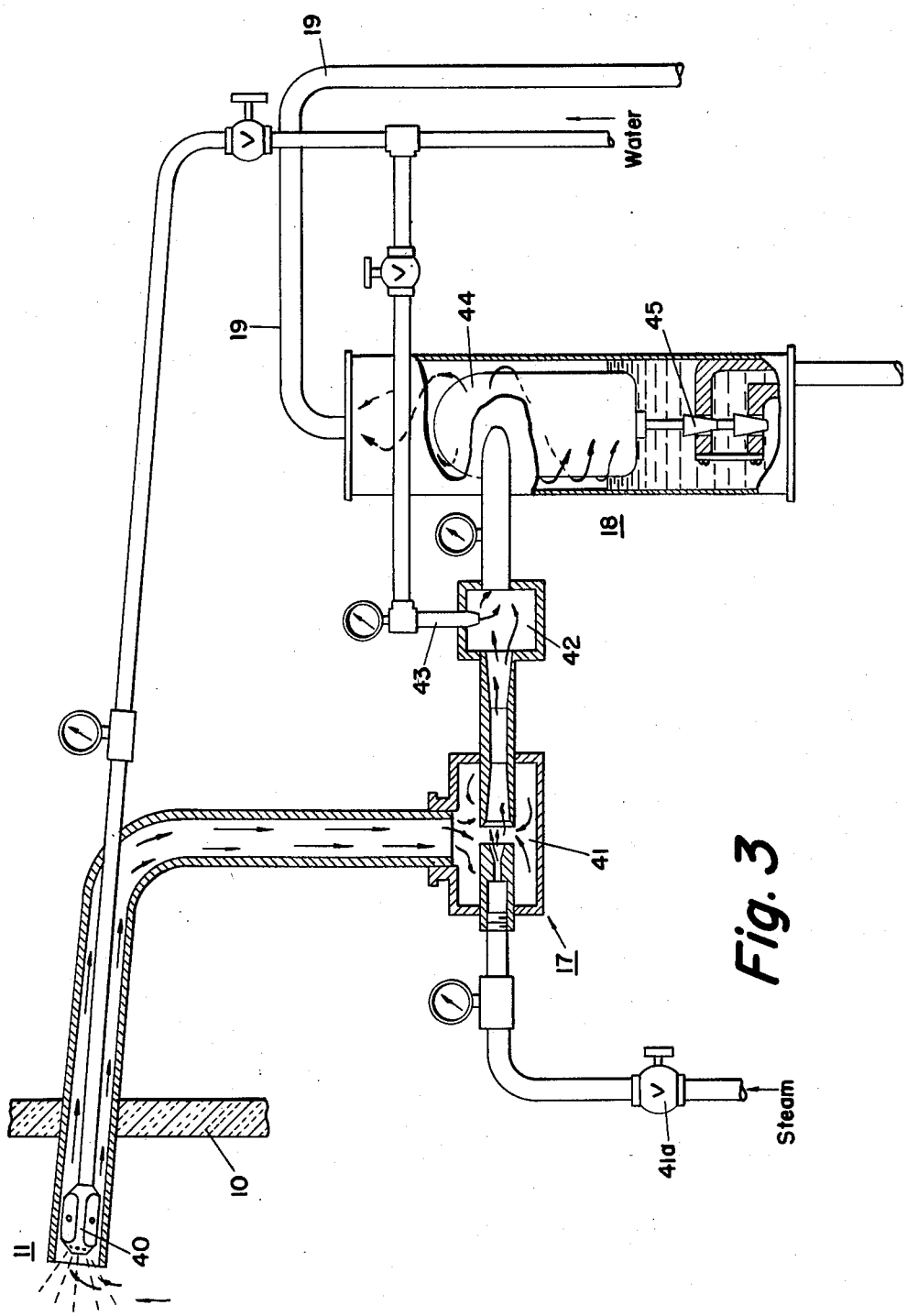

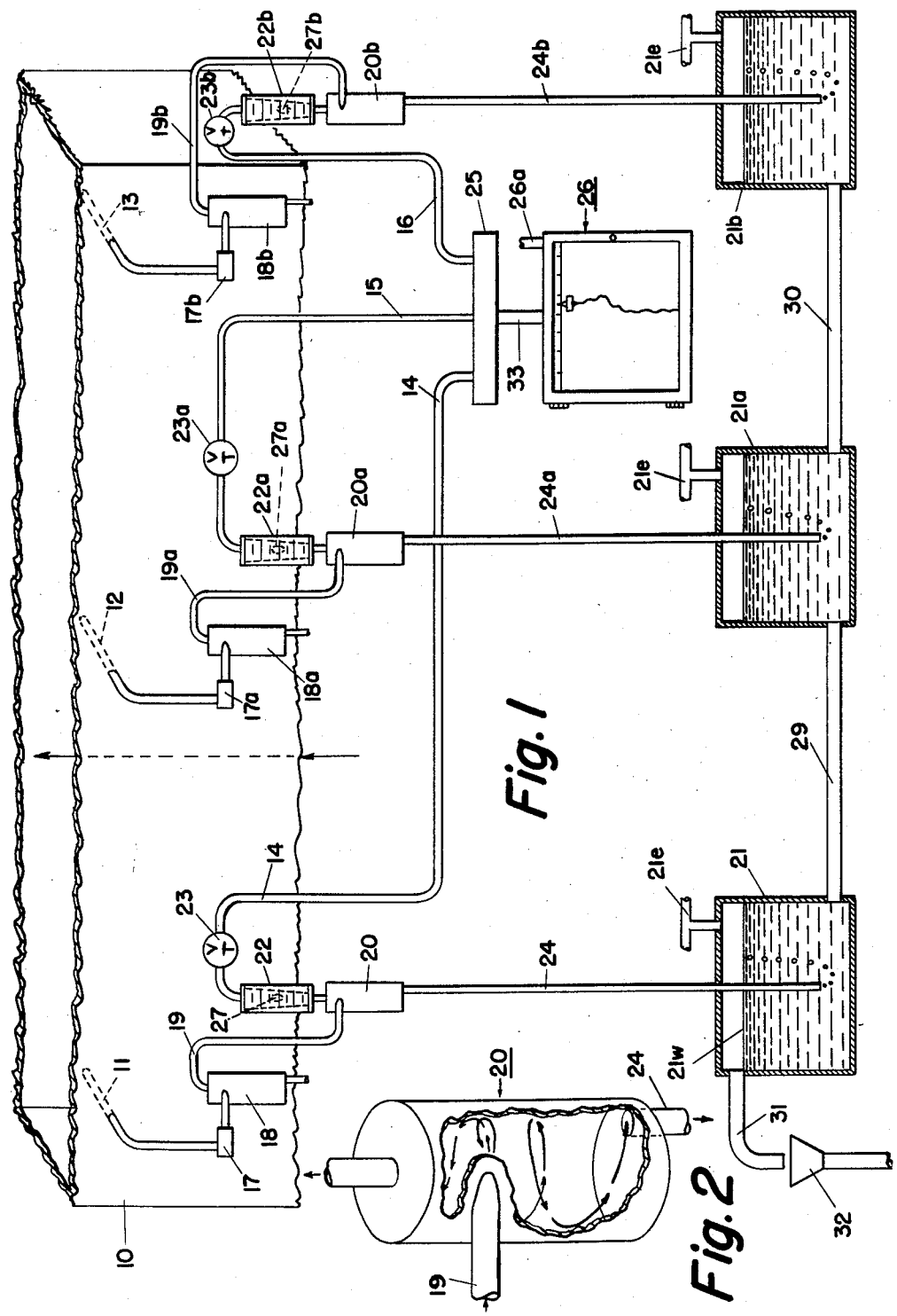

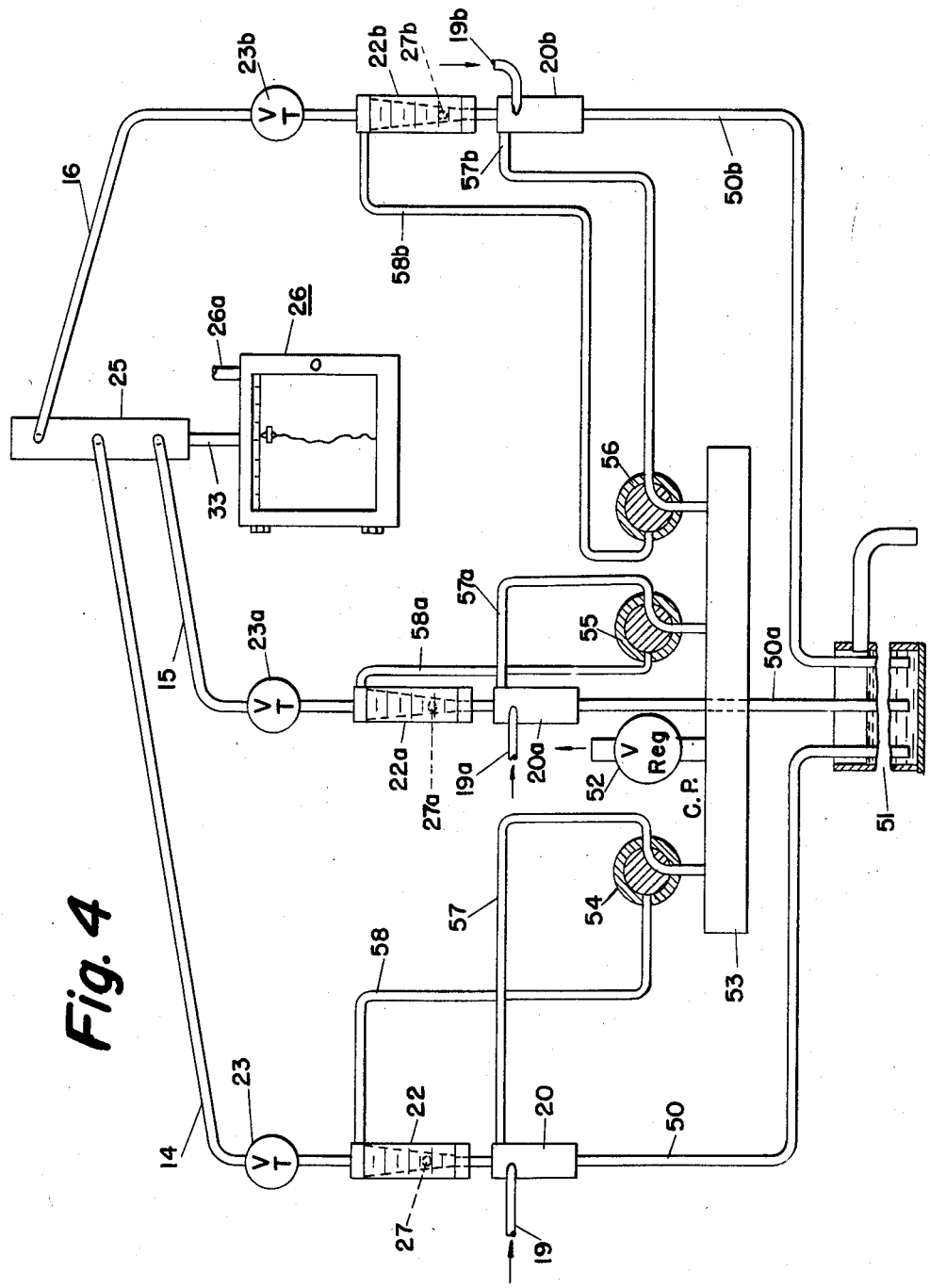

United States Patent Office 2,930,237
Patented Mar. 29, 1960

2,930,237

FLUE GAS SAMPLING SYSTEM

George D. Fowle, Jr., Ithan, and Harry A. Kraftson, Bala-Cynwyd, Pa., assignors to Leeds and Northrup Company, Philadelphia, Pa., a corporation of Pennsylvania Application June 19, 1956, Serial No. 592,413

12 Claims. (Cl. 73—421.5)

This invention relates to flue gas sampling equipment and has for an object the provision of a method of and means for producing a gas sample which is representative of a weighted average of the flue gas within ducts of large and widely differing cross-sectional areas.

As modern steam boilers have increased in size and complexity, the flue ducts themselves have grown in size until the cross-sectional areas have made gas samples taken from a single location quite unreliable. The problem has been further complicated by reason of the fact that flue ducts themselves are sometimes subdivided in regulation of the flow of combustion products through one or more economizers or other types of heat exchange units. The problem in part is one of stratification of the gas stream caused by incomplete mixing of the gases before passing into the stack. Where the flue gas duct extends across the steam boiler which is fired from a plurality of burners, the stratification problem is aggravated since uniformity of gas composition in the flue duct will then depend upon a plurality of factors, including the uniform and equal rates of supply of fuel and air to the several burners.

It is frequently desirable to take gas samples from the flue gas ductwork from a position upstream from the air preheater, and at this point the ductwork may have a cross-section having dimensions of 30 or 40 feet by 15 or 20 feet. With cross-sectional areas for the flow path of this order in mind, a better understanding will be had of the problem of stratification.

Recirculation means and dampers in the gas passages which form a part of the heat control system for the boiler further complicate the stratification problem as it affects the obtainment of gas samples which are truly representative of the flue gas constituents. These constituents are increasingly important as a guide to the amount of excess air in the furnace proper, particularly for furnaces having recirculating flue gases.

In accordance with the present invention, a plurality of flue gas samples are withdrawn from selected regions of the flue gas ductwork and are so located with respect to the gas ductwork and the factors which affect flue gas flow therein that an average thereof can be utilized as representative of the flue gas within the duct. These gas samples are preferably obtained in accordance with the method and apparatus of copending application Serial No. 558,731, filed January 12, 1956 by Harry A. Kraftson, et al., issued July 21, 1959 as United States Letters Patent No. 2,895,335. Each flue gas sample is cleaned to provide a liquid-free and solid-free gas sample. The arrangement disclosed in said copending application assures continuity of gas flow from each of the selected locations of the ductwork and contributes to the reliability of operation of embodiments of the present invention.

The clean gas samples are directed to flow channels, each of which includes a flow meter and a flow-adjusting orifice. There is provided a means common to each flow passage for maintaining a constant back pressure upon the flow meters. Each said orifice in the form of a flow-adjusting valve is then regulated to provide a known and predetermined flow rate for each gas sample. The selected gas samples are then mixed together in order to provide a weighted average gas sample which will be truly representative of the gases passing through the ductwork.

For further objects and advantages of the invention and for a detailed description of typical embodiments thereof, reference is to be had to the following description taken in conjunction with the accompanying drawings, in which:

Fig. 1 diagrammatically illustrates one embodiment of the invention;

Fig. 2 illustrates a separator of the type which may be used in each embodiment of the invention;

Fig. 3 diagrammatically illustrates a cleaning and scrubbing arrangement applicable to each embodiment of the invention; and Fig. 4 diagrammatically illustrates a modified form of the invention.

Referring to Fig. 1, the invention in one form has been shown applied to a flue gas duct 10 which, it will be observed, has a large cross-sectional area normal to the path of flow and through which flue gases may stratify, making difficult the obtainment of a gas sample whose composition is representative of the real average composition of the gas stream within the duct 10. In accordance with the invention, there are not only provided a plurality of gas probes 11, 12 and 13 disposed at different locations across the duct 10, but there are also provided means for delivering to a mixing zone or averaging manifold substreams which flow by way of pipes 14, 15 and 16, each having a flow rate which is maintained in fixed relation to the flow rates of the remaining substreams.

As will later be more fully explained, the probes 11–13 are preferably of the type disclosed in said copending application Serial No. 558,731 and include a self-cleaning feature for the end of each probe which minimizes clogging and which maintains substantially uniform the withdrawal of sampling streams from the duct 10. The arrangement of said application also includes an injector 17 and a scrubbing arrangement which in conjunction with a separator 18 delivers into a pipe 19 a solid-free and liquid-free stream of flue gas. In accordance with the present invention, the clean gas stream is delivered to a further separator 20 having associated therewith a back pressure regulating device 21. The separator 20 is connected to a flow meter 22 and in conjunction with a throttling valve 23 provides a metered flow of a clean substream of flue gas in the pipe 14. Like provisions have been made for the remaining probes 12 and 13 and corresponding parts have been given like reference characters, but with the addition of suffixes *a* and *b*.

The back pressure regulating means 21 includes a pipe 24 extending from the separator 20 to a subsurface level which provides a head or pressure against which the gas from separator 20 must flow. More particularly, the clean sampling stream in pipe 19 is under substantial pressure and it flows at a relatively high rate into the separator 20. As better shown in Fig. 2, its entry through the pipe 19 is adjacent a wall thereof and produces within the separator 20 rotation of the gases. Any droplets of moisture present, due to condensation of water vapor, will thereby be thrown to the walls of the separator 20 and will descend into the outlet pipe 24. The separator 20 provides a dividing means for the clean sampling stream 19. A substream flows from the separator 20 by way of a meter 22 and throttling valve 23, the pipe 14, a mixing zone or manifold 25, and a gas analyzing means 26. A waste stream flows from the separator 20 by way of the line 24 and through the liquid 21w of the device 21.

The flow meter 22 may be of any suitable type and has been illustrated as a rotameter which includes a float 27 which, by reason of a tapered flow channel, rises and falls relative to a scale to indicate flow rate. Accordingly, by adjusting the throttling valve 23, a particular flow rate may be selected as indicated by the flow meter 22. Thereafter, change in the rate of flow of the clean sampling stream in pipe 19 will not affect to any substantially degree the flow rate in the pipe 14. This desirable result is accomplished by reason of the constant back pressure which is maintained upon the dividing means or separator 20 by the fixed back pressure due to the fixed level of liquid 21w in the device 21. Thus, as the flow rate of the clean sampling stream 19 changes, the flow rate of the waste stream through the pipe 24 changes to maintain a substantially constant back pressure upon the meter 22 and particularly upon the entrance side of the throttling valve 23. Thus, there is maintained a substantially constant differential of pressure between the dividing means 20 and the analyzing means 26 and particularly at the manifold 25. The analyzer 26 is provided with a gas outlet 26a, and each of the constant back pressure devices 21, 21a and 21b is provided both with gas outlets and with constant liquid level devices which, in Fig. 1, have been illustrated as including the piping 29 and 30 interconnecting the vessels and the outlet pipe 31 which discharges into a drain 32.

The throttling valves 23, 23a and 23b will be adjusted to predetermine the rate of flow of each substream within the pipes or gas flow channels 14, 15 and 16. While in general the rates of flow of the substreams in pipes 15 and 16 will be adjusted to the same rate of flow as the substream in pipe 14, it is to be understood that they may differ one from the other. For example, velocity measurements may be made within the duct 10 to determine the uniformity of flow of gases at the locations of the probes 11–13. Where the rates of flow differ, the throttling valves 23, 23a and 23b may be adjusted to provide corresponding differences in flow rates for the substreams in pipes 14–16 respectively. The particular locations selected for the probes 11–13, and the number of them, may vary with different installations. In general, they will be of adequate number and so located within the flue duct 10 that the mixture of the streams within the manifold 25 will be representative of a true average composition of the gas stream in the duct 10, i.e., a weighted average gas sample.

The throttling valves 23, 23a and 23b represent convenient means for individually adjusting the rates of flow of the substreams in pipes 14–16. The flow rates of the substreams can in the absence of the throttling valves be adjusted by varying the depth below the liquid level of each of the devices 21, 21a and 21b of the pipes 24, 24a and 24b. For example, by decreasing the depth of penetration of the pipe 24 in the liquid 21w, a lower rate of gas flow of the substream in pipe 14 will be obtained. By having each of pipes 24, 24a and 24b extend into the liquid to different subsurface levels, further adjustments can be made in the flow rates of the substreams in pipes 14–16.

The substreams in the mixing zone or manifold 25 thoroughly mix together and pass by way of the pipe 33 into the gas analyzing means 26 and outwardly therefrom through the discharge element 26a.

The analyzing means 26 may be of conventional design; for example, as shown in United States Letters Patent No. 2,603,964 to G. M. Foley et al., and will be selected for the determination of the concentration within the flue gas of the constituent or constituents of interest. These are, in general, the oxygen content, the content of carbon dioxide, hydrogen, carbon monoxide, and the like, though it is to be understood that these examples are to be taken as illustrative and not by way of limitation.

Where cleaning devices of different character are utilized or where the gas samples to be averaged are initially clean, the dividing means 20, 20a and 20b may suffice for removing condensation. For such systems and for other types of scrubbing devices, suction may be applied to the outlet 26a and to the outlet 21e to establish the pressure differential required by the system. In this modification, the discharge pipe 31 will be provided with the usual water seal which may be in the form illustrated in Fig. 4.

Mention has already been made of the fact that each probe and associated cleaning means is of the type disclosed in said copending application Serial No. 558,731. In brief, the probe 11, Fig. 3, includes a pipe within which there is a water spray 40 directed outwardly of the probe and also toward the walls of the surrounding tube. By action of a steam injector 41, flue gas is withdrawn into the probe and directed into a scrubbing chamber 42 into which there is introduced a stream of water as through the nozzle 43. The steam from the injector 41 is condensed in the scrubbing chamber 42, and the mixture is directed tangentially into the separator 18. The mixture within the separator 18 flows in a vortical path, and solid material from the flue gases is effectively thrown to the outer walls of the separator and washed downwardly. A float 44 actuates a valve 45 to maintain a substantially constant level of liquid within the separator 18. A cleaned stream of gas flows outwardly through the pipe 19. For a more detailed description of the arrangement, reference may be had to said copending application.

Referring now to Fig. 4, corresponding parts have been given the same reference characters as in the modification of Fig. 1. The clean gas samples enter the separators 20, 20a and 20b as by way of the pipes 19, 19a and 19b. These separators again function as flow-dividing means, but the manner in which regulated and predetermined rates of flow are established in the lines 14, 15 and 16 differs from the arrangement of Fig. 1. In Fig. 4 the pipes 50, 50a and 50b are drain pipes for condensate from the separators, and each terminates within a liquid sealing arrangement shown as a vessel 51 of sufficient depth to prevent gas flow through the drain pipes 50, 50a and 50b. The back pressure upon each of separators 20, 20a and 20b is regulated by a back pressure regulating valve 52 which maintains a constant pressure upon a manifold 53 which, in turn, is in flow connection with the separators by way of the valves 54, 55 and 56 and by way of pipes 57, 57a and 57b. Accordingly, the throttling valves 23, 23a and 23b can be adjusted in conjunction with the flow meters 22, 22a and 22b to predetermine the flow rates in the substreams flowing by way of lines 14, 15 and 16 into the mixing zone or manifold 25. The back pressure regulating valve 52 in conjunction with the manifold 53 performs the same function as the devices 21, 21a and 21b of Fig. 1. The arrangement of Fig. 4 will, in general, be preferred by reason of the saving in space and the avoidance of providing a supply of liquid 21w to maintain constant liquid level in the several back pressure regulating devices 21, 21a and 21b.

Further in connection with Fig. 4, the valves 54–56 have been illustrated as three-way, two-position valves, and they provide additional desirable features of operation in conjunction with the lines 58, 58a and 58b. Thus, the valve 56, for example, may occupy a position differing from that of the valves 54 and 55 and serve in this position to close the gas passage through pipe 57b and to provide a gas passage from the upper end of the flow meter 22b to the back pressure manifold 53. Accordingly, all of the sampling stream entering through the pipe 19b will then pass through the flow meter 22b which then provides an indication of the total gas flow of the sampling stream. The meter 22b will continuously indicate the rate of flow of the sampling stream in 19b, while the flow meters 22 and 22a will be continuously indicating the rates of flow of substreams flowing into the averaging manifold 25. Thus, by operating the valves 54, 55 and 56, the flow meters 22, 22a and 22b may be used either for measurement of the rates of flow of substreams or of sampling streams.

It is here emphasized that the valves 54-56 in either of their positions do not affect in any way any of the rates of flow, and particularly the rates of flow of the substreams passing by way of pipes 14-16 into the averaging manifold 25. Operation of valve 56, as described, merely changes the flow of the waste stream from a point ahead of the entrance to flow meter 22b to a point following the flow meter, i.e., at its outlet. Since the back pressure is applied by way of the flow connections for the waste stream, it too is transferred as between inlet to, pipe 57b, to outlet from, pipe 58b, of flow meter 22b. The additional flexibility thus provided has been found of considerable value in many applications of the invention. For example, it will be desirable occasionally to check the probes 11-13, Fig. 1, in terms of the flow rates of flue gases withdrawn from the duct 10. This is readily done by re-routing the sampling streams of pipes 19, 19a and 19b through the flow meters 22, 22a and 22b. There is thus obtained direct measurement of the flow rate of each sampling stream without affecting the system as a whole which maintains constant the flow rate of the substreams entering the manifold 25.

Should the flow meter 22b indicate that there has been a substantial decrease in the flow rate of the sampling stream through pipe 19b, an indication will be had that something has gone wrong with that particular sampling arrangement. If the indicated flow rate drops below that desired in the substream 16, valve 23b will be closed and operation continued on the basis of the substreams 14 and 15. Thus, the gas analyzing means 26 can continue to function until the condition which adversely affected the flow rate in sampling line 19b has been corrected. This feature is of importance where the gas analyzer 26 is being relied upon for control of the combustion conditions within a steam boiler.

The valves 54-56 are likewise helpful when placing the system as a whole in operation, since the flow meters 22, 22a and 22b then provide a means of readily adjusting the flow rates of each of the sampling streams in pipes 19, 19a and 19b as by the adjustment of the steam injector 41, a steam valve 41a being illustrated in Fig. 3 for that purpose.

Applicable to both systems is a further variation which may be taken as suggestive of additional changes and modifications which will now suggest themselves to those skilled in the art and within the scope of the appended claims. More particularly, the throttling valves 23, 23a and 23b provide for selective sampling across the duct 10, Fig. 1, for the purpose of providing information of the concentration of the constituent at each probe location. By closing the throttling valves 23 and 23a, flue gas will be delivered to the analyzer 26 by way of the substream 16, and the analyzer will indicate the concentration of the selected constituent for the location of the probe 13. By closing throttling valve 23b and opening throttling valve 23a, the same measurement may be made for the location of probe 12. By repeating the foregoing steps, closing valve 23a and opening valve 23, there will have been completed a traverse-survey of the duct 10 with successive indications of the concentration of the selective constituent at the several probe locations. The foregoing can be accomplished in a minimum of time in contrast with the physical movement of the probe from one location to another within the duct.

What is claimed is:

1. An apparatus for obtaining an average gas sample of gas being sampled, comprising a plurality of sampling probes spaced one from the other for withdrawal of sample gas streams from a plurality of different locations, means for cleaning solids and liquids from each sample gas stream, means having entrance openings respectively receiving said gas streams for dividing each sample gas stream into a substream and a waste stream, a mixing manifold connected to said dividing means to receive said substreams, means for maintaining a constant differential of pressure upon each substream between said entrance openings of said dividing means and said manifold for establishing a flow rate into said manifold of each substream, which flow rate bears a fixed relation to the flow rates of the remaining substreams notwithstanding wide variations in flow rates of the sample gas streams, and analyzing means flow-connected to said manifold for determining the concentration within the mixture of the substreams of at least one constituent thereof.

2. The apparatus of claim 1 in which said means for maintaining said constant differential of pressure includes a back pressure regulating device common to each of said dividing means.

3. The apparatus of claim 2 in which said means for maintaining said constant differential of pressure includes a throttling valve for each substream.

4. The apparatus of claim 1 in which each substream has a flow meter for indicating the rate of flow thereof.

5. The apparatus of claim 1 in which a flow meter is provided for each substream, and valve means for selectively controlling the gas flow through each flow meter for measurement of the flow rate of the substream or the flow rate of the sample gas stream.

6. An apparatus for obtaining an average gas sample from a flue duct of extended cross-sectional area, comprising a plurality of sampling probes spaced one from the other across said duct for withdrawal of sample gas streams from a plurality of different locations, means for cleaning liquids and solids from each sample gas stream, dividing means having a flow meter in series flow-connection with a first outlet therefrom for dividing each cleaned sample gas stream into a substream and a waste stream, said dividing means having an inlet for receiving said cleaned gas stream and two outlets for said waste stream, one in flow connection with the inlet to said flow meter and the other at the downstream end of said flow meter, means including a valve for selectively withdrawing the waste stream from one of said two outlets, a back pressure regulating means including a manifold, means including said valves for selected application of the back pressure to one of said two outlets for the selected measurement respectively by each said flow meter of each sample gas stream and of each substream, an averaging manifold receiving a substream from each of said dividing means, and analyzing means flow-connected to said averaging manifold for determining the concentration within the mixture of the substreams of at least one constituent thereof.

7. An apparatus for obtaining an average gas sample from a plurality of sample gas streams withdrawn from a duct, comprising dividing means having entrance openings connected respectively to receive each of the sample gas streams for dividing each of said streams into a substream and a waste stream, a mixing and averaging manifold receiving the substreams, means including a back pressure regulating device for maintaining a constant differential of pressure upon each substream between said entrance openings to said dividing means and said manifold for establishing a flow rate into said manifold of each substream which bears a fixed relation to the flow rates of the remaining substreams notwithstanding wide variations in flow rates of the sample gas streams, and a flow connection to said averaging manifold for withdrawal therefrom of a weighted average gas sample having a composition representative of the average composition of the flue gas within said duct.

8. The apparatus of claim 7 in which said means for maintaining said constant differential of pressure includes a back pressure regulating device common to each of said dividing means.

9. The apparatus of claim 8 in which said means for maintaining said constant differential of pressure includes a throttling valve for each substream.

10. The apparatus of claim 7 in which each substream has a flow meter for indicating the rate of flow thereof.

11. The apparatus of claim 7 in which a flow meter is provided for each substream, and valve means for selectively controlling the gas flow through each flow meter for measurement of the flow rate of the substream or the flow rate of the sample gas stream.

12. The method of obtaining a gas sample from a duct of large cross-sectional area which is representative of the average quality of the gas mixture within said duct, which comprises withdrawing sample gas streams from a plurality of points within the duct, cleaning each sample gas stream of liquids and solids, dividing each clean sample gas stream into a substream and a waste stream, passing each substream through a flow restriction, increasing and decreasing the rate of flow of each waste stream as the rate of flow of each said sample gas stream increases and decreases by applying to the inlet side of each flow restriction the same substantially constant pressure, whereby the flow rate of each said substreams remains substantially constant notwithstanding wide variations in flow of each sample gas stream and of each waste stream, and mixing together said substreams in a mixing zone.

References Cited in the file of this patent
UNITED STATES PATENTS

| | | |
|---|---|---|
| 2,260,794 | Steudel | Oct. 28, 1941 |
| 2,452,224 | Collett | Oct. 26, 1948 |
| 2,550,933 | McEvoy | May 1, 1951 |
| 2,648,976 | Bur | Aug. 18, 1953 |
| 2,703,015 | Sykes | Mar. 1, 1955 |

FOREIGN PATENTS

| | | |
|---|---|---|
| 592,818 | Great Britain | Sept. 30, 1947 |

OTHER REFERENCES

Place: "Apparatus for Sampling Gases," The Chemist-Analyst, volume 14, Jan. 1, 1930, p. 17. (Copy in Div. 36.)